Aug. 10, 1926.
J. R. GAMMETER
1,595,082
STEERING WHEEL AND METHOD OF MAKING THE SAME
Filed March 27, 1924
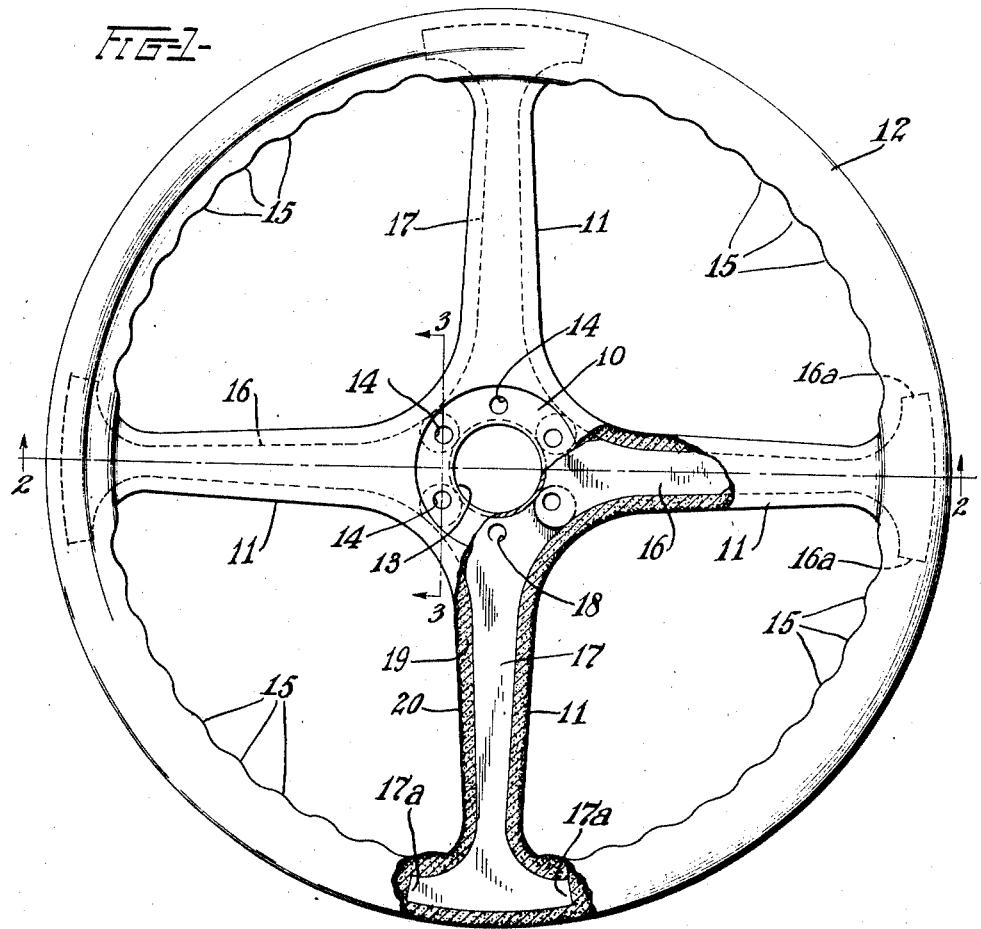
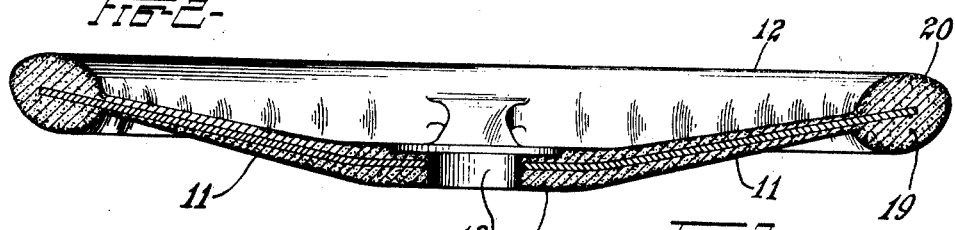
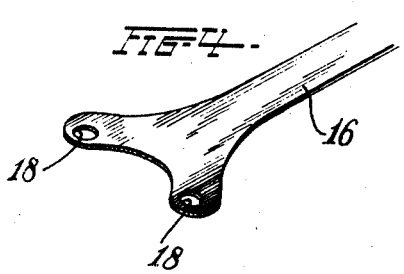
Inventor
John R. Gammeter
By Robert W. Pierson
Atty Patented Aug. 10, 1926.

1,595,082

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

STEERING WHEEL AND METHOD OF MAKING THE SAME.

Application filed March 27, 1924. Serial No. 702,319.

This invention relates to steering wheels such as are used on automobiles or power boats, and its chief object is to provide a strong and attractive steering wheel which may be manufactured more cheaply than similar wheels heretofore made.

Of the accompanying drawings:

Fig. 1 is a plan view of a steering wheel embodying and made in accordance with my invention in its preferred form, a part being broken away and in section.

Fig. 2 is a section on line 2—2 of Fig. 1.

Fig. 3 is a section on line 3—3 of Fig. 1.

Fig. 4 is a fragmentary perspective view of the hub end of one of the reinforcement members.

Referring to the drawings, the wheel comprises a hub portion 10, spokes 11, 11 radiating therefrom, and a rim 12, all of said parts being formed integrally with each other, of a moldable material, preferably cellular ebonite or hard sponge rubber. The hub portion is formed with an axial aperture 13 adapted to accommodate the upper end of a steering shaft, and with a circumferential series of smaller aperture 14, 14, disposed at equal intervals around said aperture 13, to accommodate the bolts for securing it thereto. If desired, the rim 12 may be formed with corrugations 15, 15, on its inner periphery to enable it more firmly to be gripped.

Imbedded within the respective spokes 11 are metallic reinforcement members 16, 16, 17, 17, each of which is formed at its outer end with respective lateral projections 16ª, 17ª, lying within the body of the rim portion 12. The inner end portion of each of said reinforcement members is branched or formed with a head and formed with an arcuate end face or edge concentric with the axial aperture 13. The branches of said portions are rounded and formed with perforations 18, 18 registered with the apertures 14, the heads of the members 17 being of such width as to be formed with three such perforations and to overlap the branches of the members 16, so that the perforations in the overlapped portions register. Thus the reinforcement members are adapted to be held securely together when attaching bolts are in place in the apertures 14, and the aperture 13 is thus provided with a complete, circumferential, metallic reinforcement.

Because of its light weight and relatively great strength, I prefer to make my wheel of hard cellular rubber 19, with a surface coating of dense, hard rubber 20, the latter being available in various colors so that a wheel of attractive or appropriate appearance may be produced. It will be understood, however, that other moldable materials may be substituted.

In producing the wheel I preferably stamp the metal reinforcements from sheet metal, assemble them in the relation shown, with a covering of moldable material, in a mold, with suitable mandrels or dowels in the apertures 18 adapted to mold the apertures 14, and thus mold the wheel, of course vulcanizing it in the mold in case a vulcanizable material is used. The overlapping feature at the inner ends of the reinforcement members permits them to be stamped from small sheets of metal or from large sheets with much less waste than would occur if they were all stamped integrally and yet they are adapted to be firmly secured to each other in use, providing a rigid hub structure. The extension of the reinforcement members circumferentially in the rim portion serves to brace and give strength to the structure.

Modifications may be resorted to without departing from the scope of my invention, and I do not wholly limit my claims to the specific construction shown or the exact procedure described.

I claim:

1. A steering wheel comprising a hub and spokes constituting an integrally molded structure, and reinforcement members imbedded in the spokes and interfitting with each other in said hub portion.

2. A steering wheel comprising a hub and spokes constituting an integrally molded structure, and separate reinforcement members imbedded in the spokes and hub portion and adapted to be secured to each other by the bolts with which said wheel is mounted for use.

3. A wheel comprising a hub and spokes constituting a unitary, molded structure and a reinforcement member embedded in each spoke, each of the said reinforcement members extruding integrally from its spoke into the hub of the wheel and being there of increased width such that they constitute a substantially complete annular structure.

4. A steering wheel comprising a hub and spokes constituting a unitary, molded structure, and reinforcement members imbedded in the spokes and having portions overlying each other in the hub portion, said overlying portions being formed with registered perforations.

5. A steering wheel comprising a hub, spokes and a rim constituting a unitary molded structure of hard cellular rubber having a dense, hard, surface, and metallic reinforcement members completely imbedded in the respective spokes and hub portion.

6. A steering wheel comprising a hub, spokes and a rim constituting a unitary, molded structure, and separate reinforcement members in the respective spokes and extending therefrom into the hub and rim portions, said reinforcement members interfitting with each other in the hub portion and being extended circumferentially in the rim portion.

7. The method of making a wheel which comprises forming a set of spoke reinforcing members each with a relatively broad end portion, assembling the said members in radial positions with relation to a common center and with their broad end portions innermost and constituting a substantially complete annular structure, and molding an integral covering including hub and spoke portions upon the said members thus assembled.

8. The method of making a steering wheel which comprises so forming and assembling a set of spoke reinforcing members as to provide a complete, annular hub-reinforcing structure and spoke reinforcements radiating therefrom, said members being overlapped at the hub and their overlapped portions formed with registered apertures, and molding a covering onto the structure thus assembled.

In witness whereof I have hereunto set my hand this 25th day of March, 1924.

JOHN R. GAMMETER.